(12) United States Patent
Tamura et al.

(10) Patent No.: US 9,046,664 B2
(45) Date of Patent: Jun. 2, 2015

(54) OPTICAL CONNECTOR MODULE

(75) Inventors: Mitsuaki Tamura, Kanagawa (JP);
Osamu Shimakawa, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 943 days.

(21) Appl. No.: 13/106,311

(22) Filed: May 12, 2011

(65) Prior Publication Data

US 2011/0280522 A1 Nov. 17, 2011

(30) Foreign Application Priority Data

May 17, 2010 (JP) ................................ 2010-112862
May 17, 2010 (JP) ................................ 2010-112906
May 17, 2010 (JP) ................................ 2010-112920

(51) Int. Cl.
*G02B 6/32* (2006.01)
*G02B 6/42* (2006.01)
*G02B 6/36* (2006.01)

(52) U.S. Cl.
CPC .............. *G02B 6/4214* (2013.01); *G02B 6/322* (2013.01); *G02B 6/3636* (2013.01); *G02B 6/4206* (2013.01)

(58) Field of Classification Search
None
See application file for complete search history.

(56) References Cited

U.S. PATENT DOCUMENTS

| 4,691,985 A * | 9/1987 | Shank et al. ................... 385/84 |
| 7,891,884 B2 | 2/2011 | Sumi et al. |
| 8,582,934 B2 * | 11/2013 | Adler et al. .................... 385/33 |
| 2010/0108868 A1 | 5/2010 | Tamura et al. |

FOREIGN PATENT DOCUMENTS

| CN | 101493552 A | 7/2009 |
| JP | 06-201916 A | 7/1994 |
| JP | 2005-321425 A | 11/2005 |
| JP | 2007-171556 A | 7/2007 |
| JP | 2009-128657 A | 6/2009 |

OTHER PUBLICATIONS

Chinese Office Action of the corresponding Chinese Patent Application No. 201110127773.2, dated May 29, 2014.
Notification of Reasons for Rejection of the corresponding Japanese Patent Application No. 2011-104288, dated Feb. 17, 2015, which claims the same Japanese priority applications as the present application.

* cited by examiner

*Primary Examiner* — Michelle R Connelly
*Assistant Examiner* — John M Bedtelyon
(74) *Attorney, Agent, or Firm* — Global IP Counselors, LLP

(57) ABSTRACT

The object of this invention is to provide an optical connector module 1 in which the possibility of scraped wastes to exist between the lens and the tip face of the optical fiber is less and which has high optical coupling efficiency. The optical connector module 1 comprises: an optical fiber 2 having a core 2a and a plastic cladding 2b made of a first resin; a positioning device 3 made of a second resin and including a fixing portion 4 in which the optical fiber 2 is inserted; and a lens 5, wherein the hardness of the second resin is higher than that of the first resin. The tip face 2ac of a glass core 2a may protrude from the tip face 2bc of the cladding 2b toward the bottom face 4c, or otherwise the tip face 2bc of the cladding 2b may protrude from the tip face 2ac of the glass core 2a toward the bottom face 4c.

9 Claims, 4 Drawing Sheets

OPTICAL CONNECTOR MODULE

BACKGROUND OF THE INVENTION

1. Field of the Invention

The present invention relates to an optical connector module for optically coupling an optical fiber with a light emitting/receiving device and other optical parts.

2. Description of the Background Art

A photoelectric conversion module for coupling optical signals generated by a light emitting device to an optical fiber or for coupling optical signals propagated through an optical fiber to a photodetector is known. Japanese Patent Application No. 2007-171556 (Patent Document 1) describes an optical module having a photoelectric transducer package, a ferrule as an end part of an optical fiber, a lens, and a holder which is made of optically transparent resinous material and which accommodates these elements.

SUMMARY OF THE INVENTION

The object of this invention is to provide an optical connector module having high optical coupling efficiency.

To achieve the object, an optical connector module according to the invention comprises: an optical fiber having a core and a plastic cladding made of a first resin; and a positioning device made of a second resin and including a fixing portion (i.e., insertion hole) and a lens. The optical fiber is directly inserted in the fixing portion. In one embodiment, the fixing portion has a bottom face butted by a tip face of the optical fiber, and the lens is provided so as to face the bottom face. The hardness of the second resin is higher than that of the first resin. Preferably, the first resin is acrylate fluoride, and the second resin is polyetherimide.

In the optical connector module of the present invention, the optical fiber may be a plastic clad fiber (PCF) which has a glass core and a plastic cladding, and the tip face of the glass core may protrude from the tip face of the plastic cladding toward the above-mentioned bottom face. The tip face of the glass core may be fixed to the bottom face with an adhesive, and the adhesive may also be filled between the tip face of the plastic cladding and the bottom face. In such case, preferably the refractive index of the adhesive is smaller than the refractive index of the glass core.

In the optical connector module of the present invention, the optical fiber may be a PCF having a glass core and a plastic cladding, and the tip face of the plastic cladding may protrude from the tip face of the glass core toward the above mentioned bottom face. In such case, preferably the tip face of the plastic cladding is fixed to the bottom face with an adhesive, and the adhesive is also filled between the tip face of the glass core and the bottom face. The refractive index of the adhesive is preferably larger than the refractive index of the plastic cladding.

The advantage of the optical connector module of the present invention is that at a time of inserting an optical fiber into the fixing portion, the generation of wastes due to scraping can be suppressed because the outer circumferential portion at the tip face of the optical fiber does not scrape the positioning device. Therefore, it is possible to provide an optical connector module having high optical coupling efficiency, since less scraping wastes will intervene between the lens and the tip face of the optical fiber.

DETAILED DESCRIPTION OF THE INVENTION

Figure 1A:
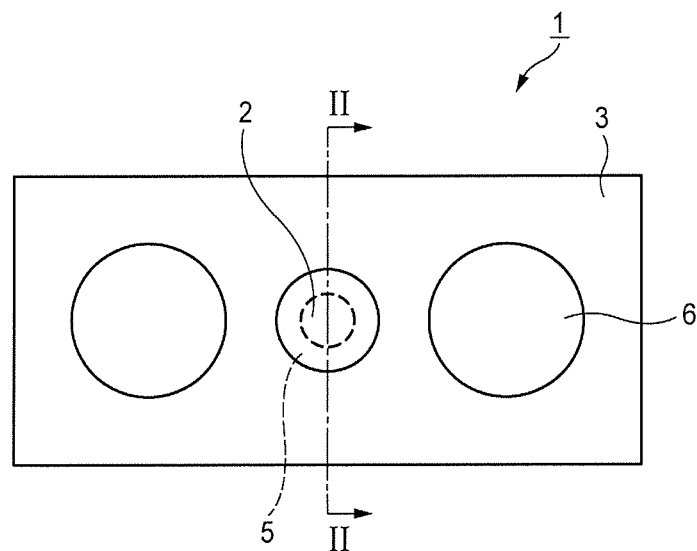
FIG. 1A is a front view of an optical connector module relating to Embodiment 1 of the present invention and FIG. 1B is a cross-sectional view taken along the line II-II of the optical connector module of FIG. 1A.

Hereinafter, preferred embodiments of the present invention will be described in reference to the accompanying drawings. The drawings are provided for the purpose of explaining the embodiments and are not intended to limit the scope of the invention. In the drawings, an identical mark represents the same element so that the repetition of explanation may be omitted. The dimensional ratios in the drawings are not always exact.

Figure 7:
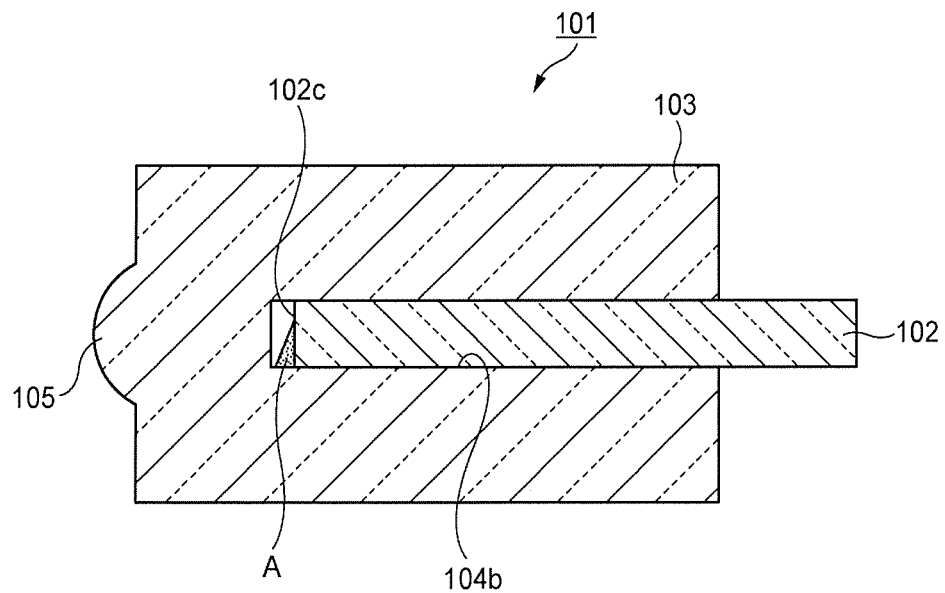
FIG. 7 is a cross-sectional side view of the optical connector module relating to a referenced example.

With respect to an optical module described in Patent Document 1, the inventors of the present invention examined attaching an optical fiber to a holder directly without using a ferrule. FIG. 7 is a cross-sectional side view of an optical connector module 101 relating to a referenced example. In the optical connector module 101, an optical fiber 102 is attached to a holder (a positioning device 103) directly without using a ferrule. In this case, the optical fiber 102 formed from glass or the like is harder than the positioning device 103 made of resin. Therefore, at the time of inserting the optical fiber 102 into the insertion hole provided in the positioning device, the circumferential portion of the tip face 102c of the optical fiber 102 scrapes the inner wall 104b of the insertion hole of the positioning device 103, generating scraped wastes A. If the optical fiber 102 is fixed inside the insertion hole while the scraped wastes A are existing between the tip face 102c of the optical fiber 102 and the lens 105, the optical coupling efficiency will decrease due to such existence of wastes.

Figure 1B:
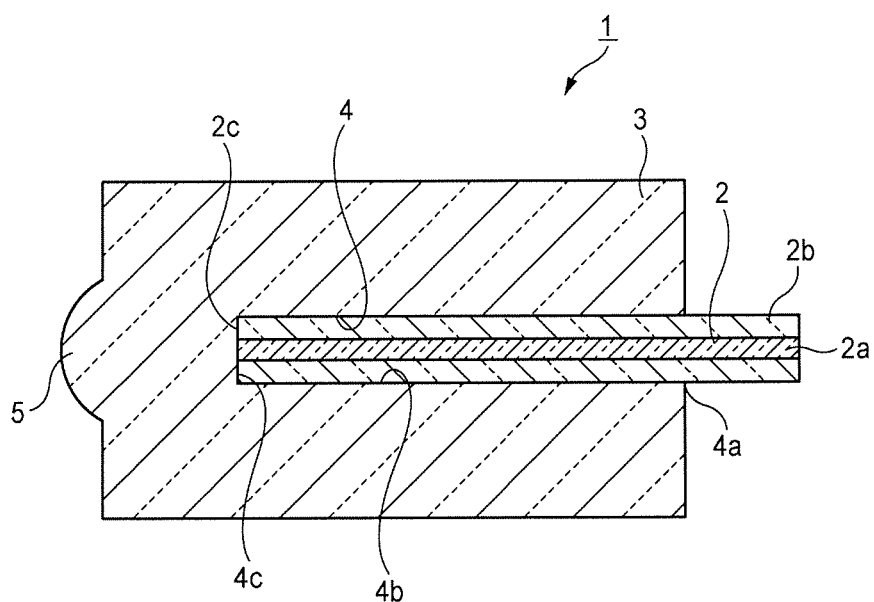

FIG. 1A is a front view of an optical connector module 1 relating to Embodiment 1 of the present invention, and FIG. 1B is a cross-sectional view taken along the line II-II of the optical connector module 1. The optical connector module 1 has an optical fiber 2 and a positioning device 3 in which the optical fiber 2 is directly inserted and fixed.

The positioning device 3, which is made of a transparent resin such as polyetherimide or the like in a shape of substantially rectangular parallelepiped, has a fixing portion (insertion hole 4) in which the optical fiber 2 is inserted, a lens 5, and an engaging concavity 6. The optical connector module 1 can be coupled with a counterpart component by engaging the engaging concavity 6 with an engaging protrusion of the counterpart component (not shown in the figure) under the conditions in which the lens 5 faces optical devices such as photoelectric transducer and a lens which are provided in the counterpart component.

The insertion hole 4 is a columnar space extending from an opening 4a to a bottom face 4c in a longitudinal direction (a direction extending from right to left in FIG. 2) of the positioning device 3, wherein the opening 4a is formed on a face of the positioning device 3 and the bottom face 4c is located at a position on the side of the lens 5. The radial size of the insertion hole 4 is substantially the same as, or a slightly larger than, the outer diameter of the optical fiber 2. The optical fiber 2 is fixed to the positioning device 3 by being inserted in the insertion hole 4 until the tip face 2c of the optical fiber 2 butts against the bottom face in a state in which an optically transparent adhesive is applied to the tip face 2c.

The lens 5 is a convex lens integrally formed with the positioning device 3. The lens 5 is formed, at a position facing the tip face of the optical fiber 2, on the face opposite the face including the opening 4a on the positioning device 3. The lens 5 is used for converging light having propagated through the optical fiber 2 so as to efficiently transmit the light to an optical device such as a lens and a photoelectric transducer such as a photodetector, which are coupled to face the lens 5.

The optical fiber 2 has a core 2a and a plastic cladding (cladding 2b) whose refractive index is smaller than that of the core 2a. To prevent the cladding 2b from scraping the positioning device 3, the cladding 2b is made of a material that is less hard than the material of the positioning device 3. More specifically, acrylic resin such as fluoroacrylate can be used as a material of the cladding 2b. As for the material of the core 2a, it does not particularly matter since the core 2a will not directly touch the positioning device 3 and hence will not scrape the positioning device 3; therefore it is possible to use silica glass or polymethyl methacrylate (PMMA) which has a refractive index larger than that of the acrylic resin.

As for the positioning device 3, it is possible to use a resin such as polyetherimide having hardness which is higher than the hardness of the material of the cladding 2b. An example of polyetherimide is Ultem (registered trademark: SABIC Innovative Plastics Holding, IP BV) can be used. For example, the cladding 2b will not scrape the positioning device 3 if Ultem having hardness equivalent to pencil hardness of H is used for the positioning device 3, while fluoroacrylate having pencil hardness of HB is used for the cladding 2b.

An example of resin, other than polyetherimide resin, that can be used for the positioning device 3 is TERALINK (registered trademark: Sumitomo Electric Fine Polymer, Inc.). TERALINK is one or more kinds of cross-linkable thermoplastic resins selected from the group consisting of transparent polyamide, cyclic polyolefin, fluororesin, polyester, acryl, polycarbonate, and ionomer resin. If TERALINK having a pencil hardness of H is used for the positioning device 3, the cladding 2b will not scrape the positioning device 3, since it is harder than fluoroacrylate having pencil hardness HB of the cladding 2b.

For making the optical connector module 1, the optical fiber 2 is inserted into the insertion hole 4 until the tip face of the optical fiber 2 butts against the bottom face 4c. In such case, the outer circumferential portion of the tip face of the optical fiber 2 will not scrape the wall of the insertion hole 4, since the hardness of the cladding 2b of the optical fiber 2 which touches the positioning device 3 is lower than the hardness of the positioning device 3. Therefore, the generation of scraped wastes will be suppressed. Consequently, the possibility of scraped wastes to exist between the tip face of the optical fiber 2 and the lens 5 will be less, and accordingly the degradation of optical coupling efficiency will be less, which enables making an optical connector module 1 having satisfactory optical coupling efficiency.

Figure 2:
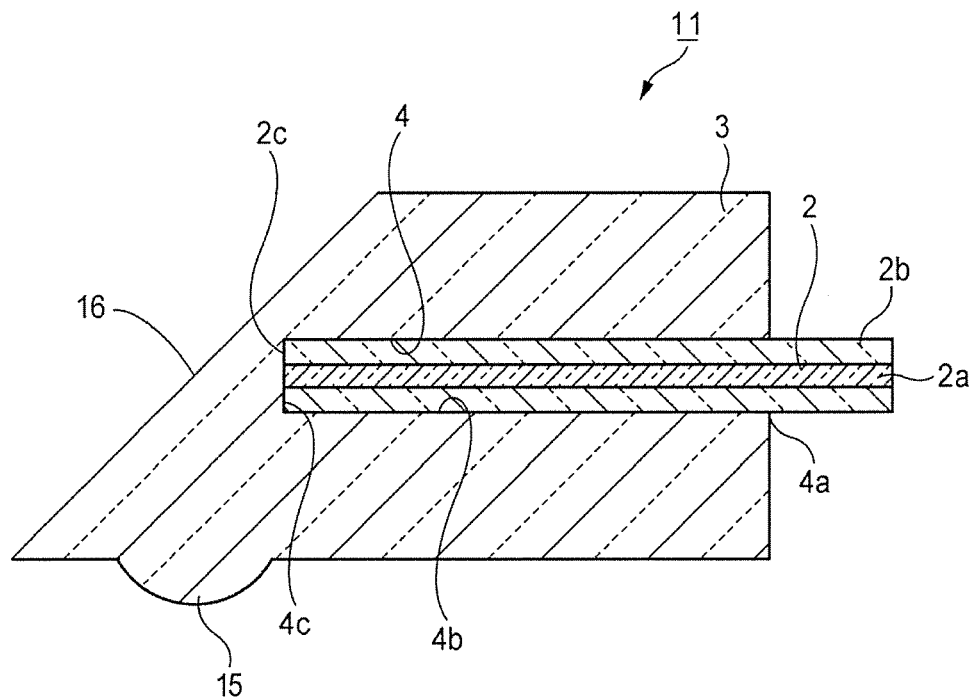
FIG. 2 is a cross-sectional view of modified example of the optical connector module of Embodiment 1.

FIG. 2 is a cross-sectional view of the optical connector module 11 which is a modified example of Embodiment 1. In the optical connector module 11, a mirror 16 is arranged at a position facing the tip face of the optical fiber 2 and a lens 15 is optically coupled with an optical fiber through the mirror 15.

The fixing portion 4 is formed in a columnar shape in Embodiment 1, but it may be in other shapes. For example, the positioning device 3 may be constituted of a base including a folding face and a cover for covering the folding face of the base so that a fixing portion 4 may be formed as a groove with a V-shaped cross-section on the folding face.

Figure 3:
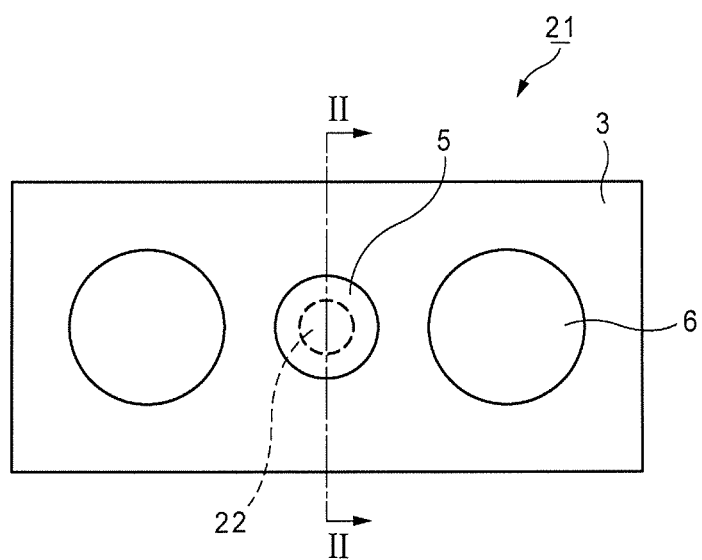
FIG. 3 is a front view of an optical connector module relating to Embodiment 2 of the present invention.
Figure 4:
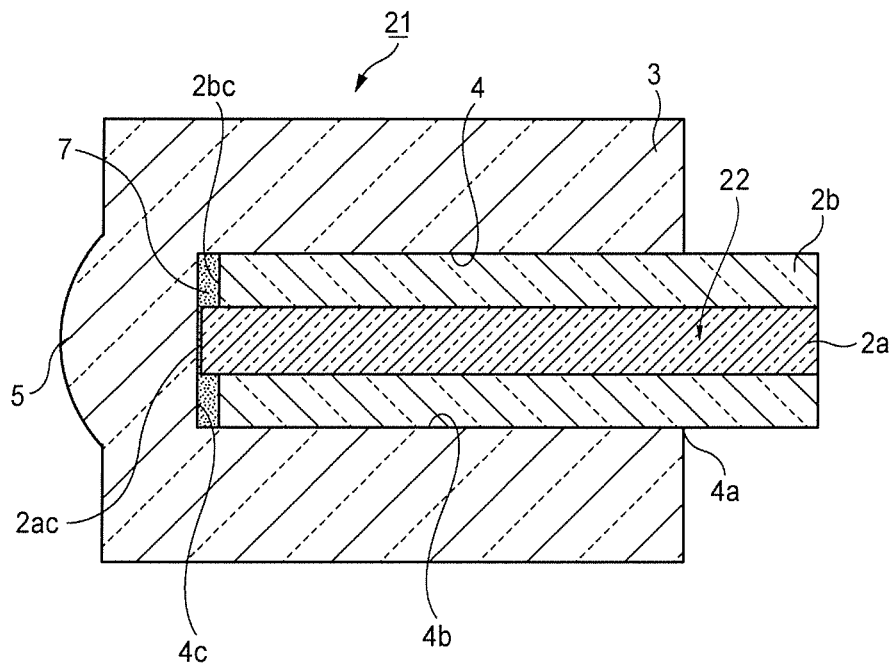
FIG. 4 is a cross-sectional view taken along the line II-II of the optical connector module of FIG. 3.

FIG. 3 is a front view of an optical connector module 21 according to Embodiment 2 of the present invention, and FIG. 4 is a cross-sectional view taken along the line II-II of the optical connector module 21. The optical connector module 21 has an optical fiber 22 and a positioning device 3 in which the optical fiber 22 is directly inserted and fixed. The positioning device 3 is the same as that of Embodiment 1.

The optical fiber 22 may be a plastic clad fiber (PCF) in which a glass core 2a is made of silica glass or the like and a cladding 2b is made of plastic having a refractive index smaller than that of the glass core 2a. Also, the optical fiber 22 can be a hard-plastic clad fiber (HPCF) in which hard plastic such as fluoroacrylate is used for the cladding 2b. At the tip portion of the optical fiber 22, the tip face 2ac of the glass core 2a protrudes from the tip face 2bc of the cladding 2b toward the bottom face 4c such that only the core tip face 2ac butts against the bottom face 4c.

At the tip portion of the optical fiber 22, the core tip face 2ac is fixed on the bottom face 4c through an adhesive 7, and the adhesive 7 is also filled between the cladding tip face 2bc and the bottom face 4c. In other words, since the adhesive 7 is applied to the protruding core tip face 2ac and the outer circumferential surface thereof, the adhesion area of the adhesive 7 can be made larger as compared with the case in which the core tip face 2ac and the cladding tip face 2bc are arranged to a uniform extent. Therefore, it is possible to enhance the adhering strength for attaching the optical fiber 22 to the positioning device 3, and accordingly it is possible to restrain the detachment of the core tip face 2ac from the bottom face 4c. Consequently, it is possible to maintain a stable optical coupling efficiency even in the case of the optical connector module 21 in which a PCF is used as the optical fiber 22.

Preferably, the protrusion quantity of the core tip face 2ac from the cladding tip face 2bc is 10 to 100 μm. If the protrusion quantity of the core tip face 2ac is smaller than 10 μm, the above-mentioned adhesion area might be so inadequate as to lack a sufficient adhering strength, since the outer circumferential surface of the protruding glass core 2a is small. If the protrusion quantity of the core tip face 2ac is greater than 100 μm, light will leak outside from the protruding portion of the glass core 2a, resulting in the degradation of the optical coupling efficiency of the optical connector module 21.

As for the adhesive 7, it is preferable to use an optically transparent adhesive having a refractive index smaller than that of the glass core 2a. More preferably, the adhesive 7 has substantially the same refractive index as the cladding 2b. A preferable example of the adhesive 7 is a refractive-index-adjusted optical-path-coupling adhesive made by NTT Advance Technology, Inc.

By using such an adhesive 7, the optical coupling efficiency of the optical connector module 21 can be maintained. In other words, even if light emitted from the glass core 2a attempts to be incident on the optically transparent adhesive 7 at the tip portion of the optical fiber 22 where the glass core 2a protrudes from the cladding 2b toward the bottom face 4c, it is possible to restrain signal light from leaking outside from the protruding glass core 2a, since the total reflection of light will occur at the interface between the glass core 2a and the adhesive 7 because the refractive index of the adhesive 7 located outside the protruding glass core 2a is smaller, like the cladding 2b, than that of the glass core 2a. Consequently, it is possible to maintain the optical coupling efficiency of the optical connector module 21 more stably.

In the case where a PCF which exhibits low loss and excellent processing ease is used as an optical fiber for the optical connector module of Embodiment 1, the cladding 2b will elastically transform to keep the connection with the bottom face 4c if a tension is applied to the optical fiber 2 when the PCF is simply inserted and fixed in the insertion hole formed in the positioning device; however, the glass core 2a might not elastically transform and might be detached from the bottom face 4c because of differences in the material characteristics between the core and the plastic cladding. In such case, if the tip face of the glass core 2a and the tip face of the cladding 2b are arranged to a uniform extent and if the tip face of the optical fiber 2 is flat, only the tip face of the cladding 2b is fixed to the bottom face 4c through the adhesive, resulting in insufficient adhesion between the glass core 2a and the bottom face 4c. Therefore, it has been a matter of apprehension that the optical coupling efficiency might decrease because of increase in the attenuation of optical signals if the glass core 2a is detached from the bottom face 4c when a tension is applied to the optical fiber 2.

On the other hand, in the case of an optical connector module according to Embodiment 2, the tip face of the glass core protrudes toward the bottom face from the tip face of the plastic cladding, and an adhesive is filled between the tip face of the plastic cladding and the bottom face in addition to the tip face of the glass core and the bottom face. Consequently, the adhesive is also applied to the tip face and the outer circumferential surface of the protruding glass core, which results in a larger adhesion area as compared with the case where the tip face of the glass core and the tip face of the plastic cladding are uniformly arranged. Therefore, firm attachment of the optical fiber to the positioning device can be ensured, such that the tip face of the optical fiber will rarely be detached. Thus, it is possible to stably maintain the optical coupling efficiency.

Figure 5:
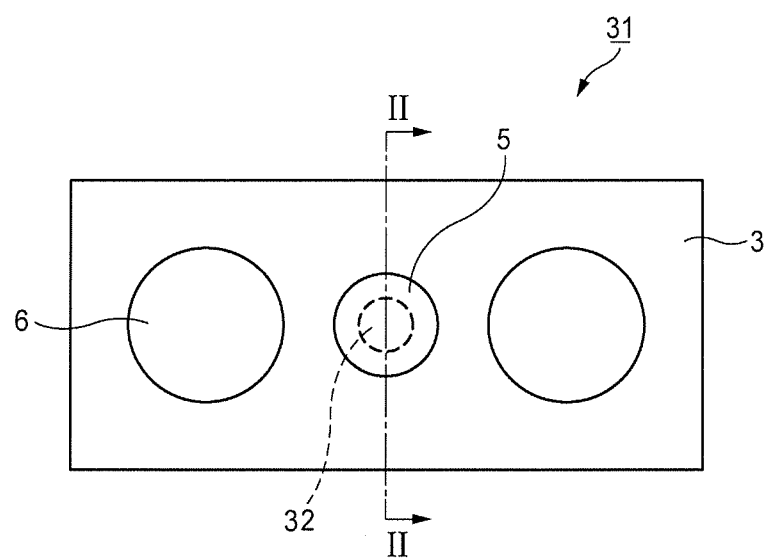
FIG. 5 is a front view of an optical connector module relating to Embodiment 3 of the present invention.
Figure 6:
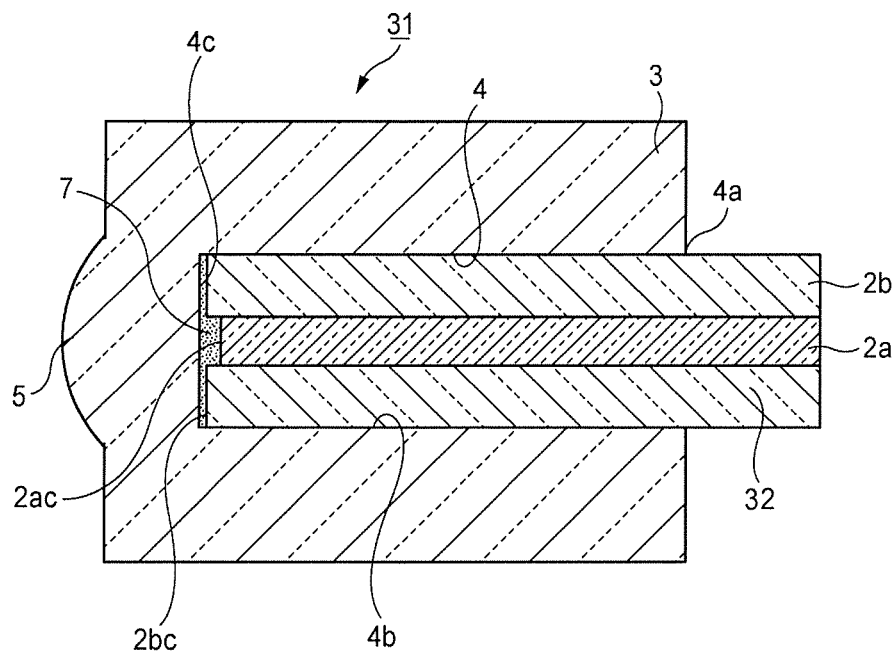
FIG. 6 is a cross-sectional view taken along the line II-II of the optical connector module of FIG. 5.

FIG. 5 is a front view of an optical connector module 31 relating to Embodiment 3 of the present invention, and FIG. 6 is the II-II cross-sectional view of the optical connector module 31. The optical connector module 31 has an optical fiber 32 and a positioning device 3 in which the optical fiber 32 is directly inserted and fixed. The positioning device 3 is the same as Embodiment 1.

The optical fiber 32 is a plastic clad fiber (PCF) having a glass core 2a made of silica glass or the like and a cladding 2b made of plastic having a refractive index smaller than that of the glass core 2a. Or, a hard plastic clad fiber (HPCF), in which hard plastic such as fluoroacrylate is used for the cladding 2b, can also be used as the optical fiber 32. In this embodiment, at the tip portion of the optical fiber 32, the tip face 2bc of the cladding 2b protrudes toward the bottom face 4c from the tip face 2ac of the glass core 2a such that only the cladding tip face 2bc butts against the bottom face 4c.

When the optical fiber 32 is inserted into the insertion hole 4 and fixed to the positioning device 3, the tip face 2bc of the cladding 2b protrudes from the tip face 2ac of the glass core 2a toward the bottom face 4 such that only the cladding tip face 2bc, which is as hard as, or less hard than, the positioning device 3, butts against the bottom face 4, and the core tip face 2ac which is harder than that of the positioning device 3 does not butt against the bottom face 4c. Therefore, the core tip face 2ac and the bottom face 4c of the insertion hole 4 can be prevented from being damaged. Consequently, the optical connector module 31 having excellent optical coupling efficiency can stably be provided.

Also, when the optical fiber 32 is inserted into the insertion hole 4, only the soft cladding tip face 2bc touches the wall 4b of the insertion hole 4; therefore the optical fiber 32 will not scrape the wall 4b. Consequently, it is possible to provide an optical connector module 31 having high optical coupling efficiency, since there will be no shaved wastes to intervene between the lens 5 and the optical fiber 32.

At the tip portion of the optical fiber 32, the core tip face 2ac and the cladding tip face 2bc are fixed to the bottom face 4c through an adhesive 7. In such case, since the adhesive 7 is also filled between the core tip face 2ac and the bottom face 4c such that the adhesive 7 is applied to the inner circumferential surface of the cladding in addition to the protruding cladding tip face 2bc, the adhesion area of the adhesive 7 can be made larger as compared with the case in which the core tip face 2ac and the cladding tip face 2bc are arranged to a uniform extent. Therefore, it is possible to enhance the adhering strength of the optical fiber 32 attached to the positioning device 3, and accordingly it is possible to restrain the detachment of the cladding tip face 2bc from the bottom face 4c. Consequently, a stable optical coupling efficiency can be maintained.

As for the adhesive 7, it is preferable to use an optically transparent adhesive having a refractive index higher than that of the cladding 2b. More preferably, the adhesive 7 is an adhesive having substantially the same refractive index as the glass core 2a. An example of preferable adhesives for the adhesive 7 is GA700 that is an epoxy adhesive made by NTT Advance Technology, Inc.

By using such an adhesive 7, the optical coupling efficiency of the optical connector module 31 can be maintained. In other words, even if light emitted from the glass core 2a attempts to be incident on the optically transparent adhesive 7 so as to enter the protruding cladding 2b at the tip portion of the optical fiber 32 where the cladding 2b protrudes from the glass core 2a toward the bottom face 4c, it is possible to restrain the light from leaking outside from the protruding cladding 2b, since the total reflection of the light occurs at the interface between the cladding 2b and the adhesive 7 because the refractive index of the adhesive 7 is larger, like the glass core 2a, than that of the cladding 2b. Consequently, it is possible to maintain the optical coupling efficiency of the optical connector module 31.

Preferably, the protrusion quantity of the cladding tip face 2bc from the core tip face 2ac is 10 to 100 μm. If the protrusion quantity of the cladding tip face 2bc is smaller than 10 μm, the cladding 2b will elastically be deformed depending on the insertion pressure when the optical fiber 32 is inserted into the insertion hole 4, so that the glass core 2a might touch the bottom face 4c. Also, since the inner circumferential surface of the protruding cladding 2b is small, and the above-mentioned adhering area is small, the adhering strength might be decreased. If the protrusion quantity of the cladding tip face 2bc is greater than 100 μm, the core tip face 2ac will be distanced from the lens 5 too much, and light emitted from the core tip face 2ac will leak outside, resulting in the degradation of the optical coupling efficiency of the optical connector module 31.

In the case of an optical connector module according to Embodiment 1, if the optical fiber 2 is a low loss PCF which is superior in terms of ease of processing and if the tip face of the glass core 2a of the optical fiber 2 butts against the bottom face 4c (which is a surface to be butted by the optical fiber 2), the core tip face might damage the bottom face 4c or the core tip face itself might be damaged at a time of fixing the optical fiber 2 to the positioning device 3 since the glass core 2a is harder than the positioning device 3 made of transparent plastic. Thus, it has been feared that the optical coupling efficiency of optical connector module 1 will be decreased if such damage occurs at the glass core 2a or the bottom face 4c.

On the other hand, in the case of the optical connector module according to Embodiment 3, neither the core tip face nor the bottom face will be damaged at the time of fixing an optical fiber to the positioning device by inserting it into the fixing portion, since the tip face of the plastic cladding protrudes toward the bottom face from the tip face of the glass core, such that only the tip face of the soft plastic cladding is allowed to butt against the bottom face and the tip face of the glass core which is harder than the positioning device is not allowed to butt against the bottom face. Consequently, there will be less possibility of damage to occur at the tip face of the glass core or the bottom face of the fixing portion. Therefore, it is possible to stably provide an optical connector module having excellent optical coupling efficiency.

What is claimed is:

1. An optical connector module comprising:
   an optical fiber having a core and a plastic cladding made of a first resin; and
   a positioning device made of a second resin and including an outer surface, a fixing portion and a lens, the fixing portion being a columnar opening having a bottom surface and a uniform inner radial size throughout its entire length from the bottom surface to the outer surface such that the fixing portion fixes the optical fiber by holding the plastic cladding, the inner radial size being substantially the same as an outer diameter of the plastic cladding, wherein
   the optical fiber is directly inserted in the fixing portion and the hardness of the second resin is higher than that of the first resin.

2. An optical connector module according to claim 1, wherein
   the bottom surface is butted by a tip face of the optical fiber and the lens is provided so as to face the bottom surface.

3. An optical connector module according to claim 1, wherein
   the first resin is acrylate fluoride, and the second resin is polyetherimide.

4. An optical connector module according to claim 1, wherein
   the core of the optical fiber is glass with the plastic cladding covering the core, the bottom surface is butted by a tip face of the optical fiber, the tip face of the glass core protruding from the tip face of the plastic cladding toward the bottom surface, and wherein the tip face of the glass core is fixed to the bottom surface with an adhesive, the adhesive being filled between the tip face of the plastic cladding and the bottom surface.

5. An optical connector module according to claim 4, wherein
   the refractive index of the adhesive is smaller than the refractive index of the glass core.

6. An optical connector module according to claim 1, wherein
   the core of the optical fiber is glass with the plastic cladding covering the core, the fixing portion has a bottom surface butted by a tip face of the optical fiber, the tip face of the plastic cladding protruding from the tip face of the glass core toward the bottom surface.

7. An optical connector module according to claim 6, wherein
   the tip face of the plastic cladding is fixed to the bottom surface through an adhesive, the adhesive being filled between the tip face of the glass core and the bottom surface.

8. An optical connector module according to claim 7, wherein
   the refractive index of the adhesive is larger than the refractive index of the plastic cladding.

9. An optical connector module according to claim 1, wherein
   the columnar opening of the positioning device has an overall length, and
   that portion of the optical fiber inserted into the columnar opening is completely covered with the plastic cladding with only a tip face of the core being exposed within the columnar opening.

* * * * *